(No Model.)
G. A. ANDERSON.
COMPENSATING GEAR.
No. 536,056. Patented Mar. 19, 1895.
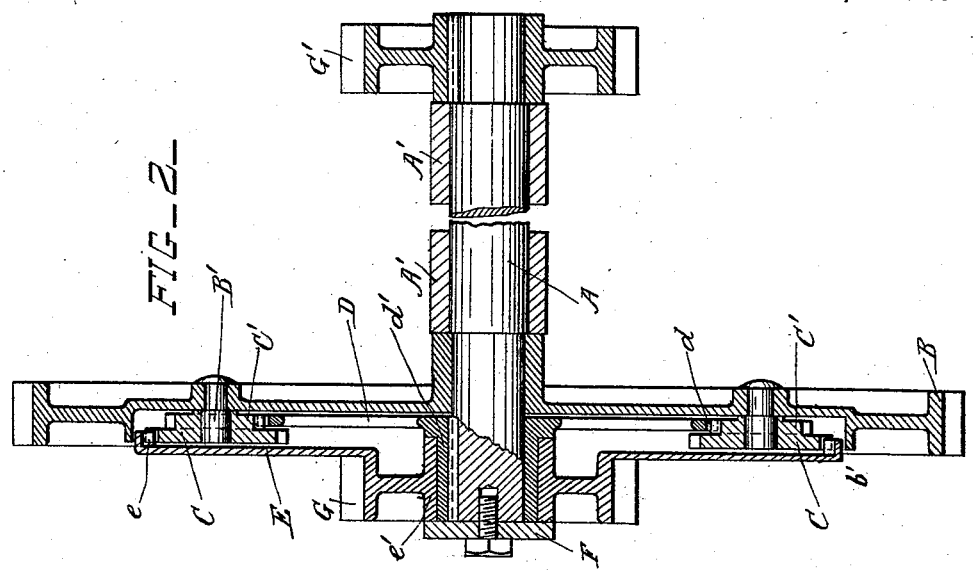
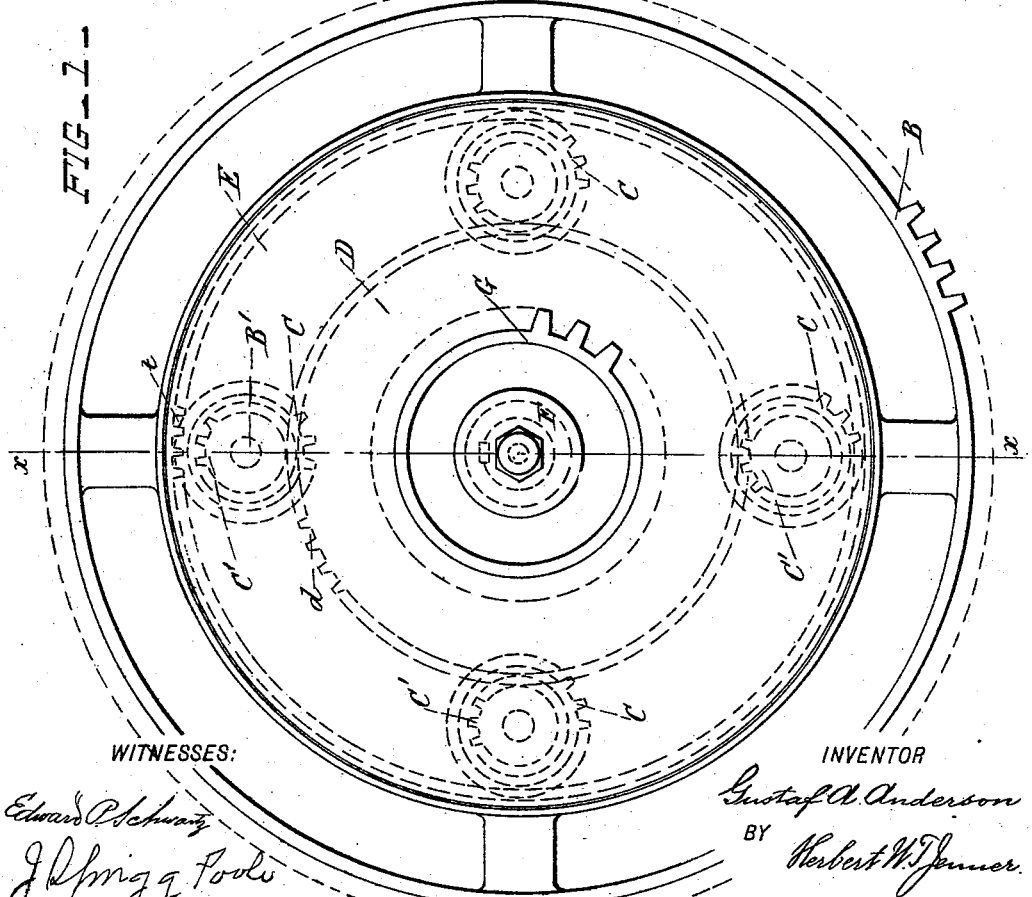
WITNESSES:
INVENTOR
Gustaf A. Anderson
BY Herbert W. Jenner
ATTORNEY.

UNITED STATES PATENT OFFICE.

GUSTAF ARVID ANDERSON, OF WAYNESBOROUGH, PENNSYLVANIA, ASSIGNOR TO THE GEISER MANUFACTURING COMPANY, OF SAME PLACE.

COMPENSATING GEAR.

SPECIFICATION forming part of Letters Patent No. 536,056, dated March 19, 1895.

Application filed December 1, 1894. Serial No. 530,609. (No model.)

*To all whom it may concern:*

Be it known that I, GUSTAF ARVID ANDERSON, a subject of the King of Sweden and Norway, residing at Waynesborough, in the county of Franklin and State of Pennsylvania, have invented certain new and useful Improvements in Compensating Gear; and I do hereby declare the following to be a full, clear, and exact description of the invention, such as will enable others skilled in the art to which it appertains to make and use the same.

This invention relates to compensating gear; and it consists in the novel construction and combination of the parts hereinafter fully described and claimed.

In the drawings: Figure 1 is an end view of the compensating gear. Fig. 2 is a longitudinal section taken on the line $x\,x$ in Fig. 1.

A is the shaft which supports the compensating gear. This shaft is journaled in bearings A' of any approved construction.

B is the driving wheel or its equivalent, such as a disk or pulley, journaled upon one end of the shaft A.

B' is a pin which projects from the web plate or an arm of the wheel B, and C C' are two toothed pinions of different diameters secured together and journaled on the said pin.

D is a wheel provided with external teeth $d$ on its periphery, and having a hub $d'$ which is keyed to the shaft A. The teeth of the wheel D gear into the teeth of the small pinion C'.

E is a wheel provided with internal teeth $e$ which gear into the teeth of the larger pinion C. The wheel E is provided with a hub $e'$ which is journaled on the hub $d'$ of the wheel D.

F is a plate secured to the end of the shaft A to keep the wheel E from slipping off the hub $d'$.

G and G' are the two power transmitting wheels. These wheels are shown as being toothed wheels in the drawings, but any other equivalent power transmitting devices, such as chain wheels, rope sheaves or belt pulleys may be used in place of them.

The wheel G is formed integral with the wheel E, or is otherwise rigidly secured to it; and the wheel G' is keyed on the shaft A.

The wheels G and G' are preferably of the same size, but this is not essential. When the wheels G and G' are of the same size, the wheels D and E and the pinions C and C' are proportioned in size so that the pressure exerted by the teeth of the wheel D upon the teeth of the pinion C' is exactly equal to the resistance of the teeth of the wheel E against the teeth of the pinion C.

When the driving wheel B is revolved in either direction it revolves the wheels G and G' with equal velocity, through the wheels D and E and the pinions C and C', as long as the said wheels G and G' are working against equal resistances. When, however, the resistance to one power transmitting wheel becomes greater than the resistance to the other power transmitting wheel, the pinions C C' turn upon their supporting pin, and the velocity of the power transmitting wheels becomes unequal.

Four pinions C C' are shown in the drawings, arranged equidistant from each other and journaled on similar supporting pins. The object of duplicating the pinions is to distribute the strain upon the wheels D and E, and to permit their teeth to be smaller in pitch which makes the said wheels lighter.

This compensating gear is applicable for many purposes where power has to be divided up, but it is more particularly adapted for use in connection with traction engines.

As applied to a traction engine, B is the counter gear which is revolved by a motor engine and intermediate driving wheels of any approved construction. A is the counter-shaft, and G and G' are the toothed pinions which gear into toothed wheels connected to the driving or road wheels of the traction engine. When the traction engine is moving along a straight road, the resistances to its road wheels are equal, and the pinions G and G' meet with equal resistances and revolve with the same velocity; but when the traction engine turns a corner, one road wheel has to move faster than the other, and the resistances to the respective road wheels and to the pinions G and G' therefore become unequal. The said pinions thereupon revolve with unequal velocity, each pinion transmitting an amount of power sufficient to overcome the resistance to which it is subjected.

In another and simpler form of traction engine, the wheel B may be a single main toothed driving wheel. The shaft A is then the axle of the road wheels, and the power transmitting wheels G and G' become the hubs of the respective road wheels.

The wheel B is provided with a flange $b'$ which fits over the periphery of the wheel E and keeps dust and dirt from getting into the gearing.

What I claim is—

In a compensating gear, the combination, with a supporting shaft, and bearings supporting the central portion of the shaft; of the driving wheel B journaled on the shaft near one end of it and provided with a laterally projecting pin, the two toothed pinions of different diameters secured together and journaled on the said pin, the external toothed wheel D secured on the end of the shaft beyond the wheel B and gearing into the smaller pinion next to the said wheel, the power transmitting wheel G' secured on the other end of the said shaft, and the power transmitting wheel G and the internal toothed wheel E secured together and journaled on the hub of the said wheel D with the wheel E gearing into the larger of the said pinions, the driving wheel B being revoluble upon the said shaft and the shaft being separately revoluble in its bearings and in the hub of the wheel B, substantially as set forth.

In testimony whereof I affix my signature in presence of two witnesses.

GUSTAF ARVID ANDERSON.

Witnesses:
J. A. MIDDOWER,
WM. G. EPPLEY.